United States Patent Office 3,041,206
Patented June 26, 1962

3,041,206
METHOD AND COMPOSITION FOR OBTAINING DIFFUSED ALUMINUM COATING LAYERS ON METAL ARTICLES
John V. Long and Alvin R. Stetson, San Diego, and John V. Furth, La Jolla, Calif., assignors to Solar Aircraft Company, San Diego, Calif., a corporation of California
No Drawing. Filed Feb. 16, 1960, Ser. No. 8,921
19 Claims. (Cl. 117—131)

The present invention relates to a method and means for developing a protective surface layer on ferrous metals by diffusing aluminum or an aluminum alloy into the basis metal, and also relates to new stabilized aluminum coating compositions utilizing a water vehicle and novel corrosion inhibitors which make it possible to use water as a vehicle. This application is a continuation-in-part of applicants' copending application Serial No. 597,876, filed July 16, 1956, now abandoned.

The general process to which our invention relates is that in which aluminum or aluminum alloy powder is suspended in a slip, which is applied to a workpiece that is thereafter fired to develop a protective coating layer consisting of aluminum diffused into and alloyed with the basis metal and providing desirable properties such as increased high temperature oxidation resistance.

A simplified flow diagram of the method is as follows:

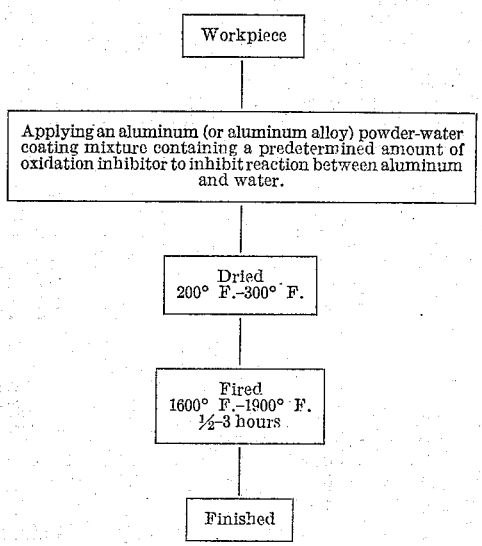

Protective aluminum coatings and means and methods for obtaining them are known in the art. For example, United States Patent No. 1,655,269 to Howe discloses a method in which aluminum powder is mixed with an organic binder and vehicle consisting of nitrocellulose dissolved in either amyl acetate or wood alcohol. The mixture is applied to the article to be coated and the article then fired to cause the organic binder to volatilize and the aluminum to melt and alloy with the basis metal of the article. Another prior process somewhat similar to Howe's and employing an organic vehicle and binder with anhydrous fused borax as a flux is disclosed in U.S. Patent No. 1,817,888 to Lowe.

Organic vehicles and binders, however, generate large amounts of gas and carbon at the elevated firing temperatures required to develop the protective coating layer, and lead to inconsistent and frequently unsatisfactory results. Among other things, the coating may not be imperforate, uniform or controllable in thickness, or everywhere securely bonded to the basis metal of the coated article. Moreover, such organic vehicles and binders are relatively expensive, especially when compared to water, which is the cheapest vehicle and does not have the aforementioned objectionable aspects of organic vehicles.

However, it is well known that in finely powdered form aluminum has a great affinity for oxygen, and that when mixed with water it will combine with the oxygen of the water to form hydrated alumina ($Al_2O_3 \cdot XH_2O$) and release hydrogen. If the mixture is in a confined space, for example in a tank or bottle, pressures will be developed that will result in dangerous explosions. Also, any reaction between the aluminum powder and water in the coating slip produces a variation in properties which are not conducive to consistent coating quality or feasible and reliable production control.

For the above reasons, all prior coating slips for such coating processes to our knowledge are based on the use of an organic solvent as the vehicle. Or, if water is the vehicle, the slips are used or completely discarded within about 30 minutes or at most an hour, because of the aluminum-water reaction. To our knowledge, all prior processes, including those in which said water slip is used, use organic binders which lead to inconsistent results because of gas and carbon formation at elevated temperatures.

It is accordingly a primary object of this invention to provide a water vehicle slip for aluminum or aluminum alloy coating metals in which there is no danger of an aluminum-water reaction.

It is another primary object of this invention to provide a water vehicle slip for aluminum or like coating metals which contains no organic vehicle or binder.

It is another object of the present invention to provide a stable water vehicle slip for aluminum or aluminum alloy coating metals which may be stored for long periods of time, i.e. weeks or months, with no hydrogen generation or other deleterious effects.

Another important object is to provide a protective coating water slip of aluminum or aluminum alloy powder which contains a novel inhibitor that completely precludes any possible reaction between the water and aluminum or aluminum alloy, yet does not interfere with the coating of said aluminum or aluminum alloy on a metallic workpiece under suitable firing conditions.

It is still a further object to provide a method of protective coating with aluminum or aluminum alloys in an air atmosphere and using a water vehicle slip.

Another object is the provision of a method of protective coating involving the direct diffusion of aluminum or aluminum alloy into the surface of the basis metal without any substantial wetting or flow of the aluminum. It is a related object to provide such a coating method in which intimate contact is obtained between the basis metal and aluminum coating powder so that direct diffusion is achieved.

Yet another important object is the provision of a novel inhibitor composition which, when added to a mixture of aluminum powder and water, precludes any reaction between the aluminum and water.

It is another related object to provide means for, and a method of, inhibiting reaction between water and aluminum or aluminum alloy powder by continuously maintaining in said water 1000–6000 parts per million of boron oxide. It is still another related object to automatically regulate the release of said boron oxide in said water by incorporating said boron oxide in a frit containing a buffering agent.

It is a still further object to provide a water vehicle slip for aluminum or aluminum alloy coating metals which effectively precludes any reaction between the metal and the water by continuously maintaining 1000–6000 parts per million of boron oxide in said slip, yet does not interfere with the coating of said metal on a metallic workpiece under suitable firing conditions.

Other objects will become apparent from the following detailed description and the appended claims.

In accordance with the present invention, it has been discovered that the foregoing objects may be achieved and the usual reaction of aluminum and water may be completely inhibited by the addition to an aluminum (or aluminum alloy) powder-water coating slip of a small, predetermined quantity of boron oxide. It has furthermore been discovered that if the ingredients of the slip are compounded as will be hereinafter set forth, not only will the aluminum-water reaction be completely inhibited, but, in addition, the slip may be used to form protective coatings far superior to those heretofore obtainable with prior art formulations.

For a reason which will become more apparent as this description proceeds, the boron oxide inhibitor is preferably incorporated in the coating slip in the form of fritted alkaline earth borates. In general, such fritted alkaline earth borates according to this invention consist essentially of an alkaline earth oxide, boron oxide and aluminum fluoride in respective molar ratios of about 1:3:½. Though all of the alkaline earth oxides may be used successfully, barium oxide is preferred. Strontium oxide is extremely expensive, while, as will become more fully apparent below, calcium oxide has a much slower rate of solubility than barium oxide and would, therefore, have to be used in quantities greater than those used in connection with the barium oxide frit.

Examples of the preparation of frits formulated as above specified are set forth below:

*Example I*

Barium oxide (BaO), boron oxide ($B_2O_3$) and aluminum fluoride ($AlF_3$) are mixed together in a molar ratio of $BaO:3B_2O_3:\frac{1}{2}AlF_3$. This mixture is smelted at a temperature of about 2200° F. for about 30 to 45 minutes until the smelt is clear and free of bubbles. The smelt then is fritted by pouring into cold water or running between cooler rollers, and the frit is thereafter ground to a preferred fineness of —200 mesh.

*Example II*

An alternative and preferred method of achieving the above frit at lower cost is to mix 197 parts by weight of barium carbonate ($BaCO_3$), 372 parts by weight of boric acid ($H_3BO_3$), and 42 parts by weight of aluminum fluoride ($AlF_3$), and melt as above. During smelting, the barium carbonate loses carbon dioxide ($CO_2$) and the boric acid loses water ($H_2O$), and the resulting frit is the desired alkaline earth borate. Barium carbonate and boric acid are cheaper and more readily available than barium oxide and boron oxide.

The frit obtained as set forth above is then used to make the coating slip. Generally speaking, the slips usable in connection with the present invention consist essentially of a water vehicle, aluminum or aluminum alloy powder, the fritted alkaline earth borate, and a binder or suspension agent (such as enameler's clay). If desired, a refractory oxide, such as alumina or zirconia, may also be added to the slip mixture.

Preferred slips are formed using 40–60 parts of aluminum or aluminum alloy powder, 1–3 parts of inhibitor, 8–15 parts of enameler's clay (i.e., Green Label clay) and 20–45 parts of alumina or zirconia, in parts by weight. While the above ratios of ingredients are preferred, however, we have also achieved satisfactory results with slips having these ingredients in the following range of parts by weight: aluminum and/or aluminum alloy powder, 32–93.5; inhibitor, 0.5–5.0; clay 6–30; and alumina or zirconia, 0–60. The ingredients should all be —200 mesh or smaller.

To prepare the slip, a dry mixture of the desired ingredients is well mixed with sufficient water to obtain the desired slip consistency. A mixture of approximately 50 parts by weight of water and 100 parts by weight of dry mixture having proven particularly satisfactory. The slip thus formed is then slushed, brushed, dipped or sprayed on the workpiece to a preferred thickness of 3–7 mils, and the part is dried. If the workpiece is mild steel or lower alloy, it is fired for from 1 to 3 hours at 1600–1750° F. in a furnace to cause the coating metal to develop a diffused protective coating on the surface of the workpiece. If the part is of one of the stainless steels, it is similarly fired at about 1900° F. from 1 to 3 hours to form the protective coating. An air atmosphere is adequate in the firing cycle for stainless steels and other high alloys. However, an inert atmosphere is preferable during the firing cycle where low alloy steels are being coated.

Some representative preferred slip compositions according to the present invention are as follows, all ingredients being stated in parts by weight.

No. 1: 600 parts aluminum of —200 mesh; 100 parts clay; 8 parts frit; 350 parts water.
No. 2: 400 parts aluminum of —200 mesh; 100 parts clay; 200 parts alumina; 8 parts frit; 350 parts water.
No. 3: 600 parts aluminum of —400 mesh; 100 parts clay; 8 parts frit; 450 parts water.

In all of the above slip compositions Nos. 1, 2, and 3, the frit is a barium oxide-boron oxide-aluminum fluoride frit, according to Example I or Example II above.

The purpose and function of each of the individual ingredients of the novel coating composition of the instant invention may be generally described as follows:

The aluminum or aluminum alloy powder diffuses during the firing cycle directly into the surface of the workpiece to form with the basis metal a protective coating which exhibits the properties of an iron-aluminum alloy layer, such as hardness, and resistance to galling and oxidation at high temperatures.

The clay is the suspending agent in the slip. During the firing cycle, it binds aluminum grains so they will not tend to agglomerate and form large balls which would attack the surface of the workpiece. The alumina (or zirconia) is also used to separate the aluminum powder grains so no agglomeration will take place during firing. Both the clay and alumina (or zirconia, fire clay or other like material) flake from the cooling piece, or may be easily removed by wiping or brushing.

The novel frit of the instant invention performs several important functions. The first of these functions is the inhibition of the aluminum-water reaction, which, as aforesaid, permits the use of an inexpensive water vehicle. The particular portion of the frit which performs the inhibiting action is the boron oxide. It has been discovered that so long as there is constantly maintained in the slip approximately 1000–6000 parts per million of the boron oxide in solution in the vehicle, the aluminum-water reaction will be effectively inhibited. If less boron oxide than 1000 p.p.m. is used, the reaction will not be effectively inhibited; if more than 6000 p.p.m. is used, the saturation point of the slip will be exceeded, the excess boron oxide will crystallize out of the solution, and the crystals will interfere with the eventual coating process and lead to inferior end coatings.

The aluminum-water reaction problem mentioned above could be solved by periodically adding boron oxide (or compounds containing boron oxide, such as borax ($Na_2B_4O_7 \cdot 10H_2O$) or boric acid ($H_3BO_3$)) directly to the water slip; i.e., by adding any material which would release boron oxide in the proper quantity when mixed with the water. However, a significant disadvantage of such manual mixing is that it would be difficult to determine the exact amount of boron oxide required at each renewal in order to maintain the proper quantity of said oxide in solution in the vehicle to inhibit the aluminum-water reaction and would require continuous and close supervision to attempt to do so, though acceptable coatings could be obtained in this manner if the proper amount of boron oxide is maintained in solution.

Because of the difficulties presented by such manual methods, as a practical matter, it is essential to have some means for automatically releasing the amount of boron oxide necessary to inhibit the aluminum-water reaction. The problem is compounded, however, by the fact that what is involved is not solely a question of inhibition of the aluminum-water reaction, since the primary purpose of the compositions of the instant invention is to provide useful diffused aluminum coatings not obtainable by prior art compositions. Hence, the inhibitor used must be formulated so as to preclude the possibility of interference with the formation of a desirable coating. For example, the inhibitor must not deleteriously affect the set of the slip as by unduly thickening it so that it is not usable for diffusion aluminum coating methods herein disclosed.

In the case of the instant invention it is also desirable to provide an inhibitor which will spall or flake from the surface of the workpiece with any excess aluminum and refractory component which has diffused into the workpiece. Many frits develop into tenacious glassy coatings which cannot be satisfactorily removed from the workpiece, and such frits would not be useful in applicants' coating process even though they might provide adequate inhibition against aluminum-water reaction and would not otherwise deleteriously affect the coating slip.

It is also probable that many good inhibitors would actually interfere with diffusion of the aluminum into the surface of the workpiece, thus precluding the possibility of obtaining really effective coatings.

The foregoing problems are completely solved, however, by the novel, fritted, alkaline earth borate of the instant invention, as the frit effectively serves to automatically release the proper quantity of boron oxide to the slip when used in proper quantity relative to the vehicle and other slip ingredients and is capable of storage over an extended period of time without significant loss in effectiveness. Apparently, the alkaline earth oxide in the frit tends to buffer the release of the boron oxide and to automatically regulate its concentration in the slip in the desired range of 1000–6000 p.p.m. of slip vehicle.

The quantity of frit which must be present in the slip to automatically insure the proper concentration of boron oxide (1000–6000 p.p.m.) to inhibit the aluminum-water reaction will vary depending upon the ingredients of the frit. For example, when the frit is a barium oxide-boron oxide-aluminum fluoride mixture, the frit should be present in approximately 1–10% by weight of the vehicle (viz., the water). Since calcium oxide has a much slower rate of solubility than barium oxide, when a calcium oxide-boron oxide-aluminum fluoride frit is used, the frit should be present in 10–20% by weight of the vehicle.

In short, the solubility of the frit, or of the boron oxide-containing ingredient if a frit is not used (i.e., borax or boric acid), will determine the relative quantities of ingredients used. If the frit or ingredient is highly soluble, a lesser quantity of frit or ingredient is used; if the frit or ingredient is only slightly soluble, a greater quantity is employed, the desideratum always being the release into the slip of approximately 1000–6000 p.p.m. of boron oxide.

Thus, when boric acid ($H_3BO_3$) is used, the boric acid (which will not be used in the form of a frit) should constitute approximately .18 to 1.06% by weight of the water; when borax ($Na_2B_4O_7 \cdot 10H_2O$) is used (also not in the form of a frit), the borax should constitute approximately .27 to 1.64% by weight of the water.

In addition to pure aluminum powder, following are representative aluminum alloys which can be utilized in the above-described diffused coating process: 90% aluminum, 10% silicon; 95% aluminum, 5% silicon; and aluminum alloys containing up to 8% iron, nickel, or cobalt, or combinations of these elements. Any aluminum alloy in which the alloying element is not deleterious to the workpiece. An example of an alloy which is not useful in coating stainless steel is an aluminum-zinc alloy. The zinc will attack the stainless steel at elevated temperatures.

It will be seen that we have developed a highly useful, inexpensive method and means for protecting ferrous materials with a diffused aluminum surface layer; that we have developed a novel and economical stable water vehicle slip for making a protective aluminum coating, while eliminating the necessity for organic vehicles and binders; that we have developed novel inhibitor compositions for stabilizing aluminum-water mixtures to prevent hydrogen generation or aluminum oxidation and to permit extended storage thereof; and that we have achieved other related improvements, advantages and objectives as hereinbefore stated.

The above inventions may be embodied in other specific forms without departing from the spirit or essential characteristics thereof. The present embodiments are therefore to be considered in all respects as illustrative and not restrictive, the scope of the inventions being indicated by the appended claims rather than by the foregoing description, and all changes which come within the meaning and range of equivalency of the claims are therefore intended to be embraced therein.

What is claimed and desired to be secured by United States Letters Patent is:

1. A process of applying a diffused metallic coating to a metal article which comprises: coating the surface of said article with a slip mixture including a major amount of small particles of a metal selected from the group consisting of aluminum and aluminum alloys and a water vehicle with a minor amount of an inhibitor for preventing reaction between the water and coating metal particles, said inhibitor consisting of a material which provides approximately 1000–6000 p.p.m. of boron oxide continuously in solution in said slip; and firing said coated article at an elevated temperature that will cause the coating metal to develop a diffused metallic protective coating layer on the surface of said article.

2. The process defined in claim 1 wherein said inhibitor is a fritted alkaline earth borate inhibitor consisting essentially of an alkaline earth oxide, boron oxide and aluminum fluoride in particle form.

3. The process recited in claim 2 wherein said alkaline earth oxide, boron oxide and aluminum fluoride are present in a molar ratio of about 1:3:½, respectively.

4. The process recited in claim 2 wherein said alkaline earth oxide is calcium oxide, said calcium oxide, boron oxide and aluminum fluoride being present respectively in a molar ratio of about 1:3:½, and wherein said inhibitor is present in approximately 10–20% by weight of said water vehicle.

5. The process recited in claim 2 wherein said alkaline earth oxide is barium oxide, said barium oxide, boron oxide and aluminum fluoride being present respectively in a molar ratio of about 1:3:½, and wherein said inhibitor is present in approximately 1–10% by weight of said water vehicle.

6. The process defined in claim 1 wherein said inhibitor is a fritted alkaline earth borate inhibitor, said alkaline earth borate consisting essentially of barium oxide, boron oxide, and aluminum fluoride in particle form.

7. A coating process as defined in claim 6 wherein said barium oxide, boron oxide and aluminum fluoride are present in a molar ratio of about 1:3:½, respectively.

8. A coating process as defined in claim 6, wherein said article is of mild steel, and the article coated with said slip mixture is fired from 1 to 3 hours at approximately 1600° F.–1750° F.

9. A coating process as defined in claim 6, wherein said coated article is of stainless steel, and the article coated with said slip is fired from 1 to 3 hours at about 1900° F.

10. A coating process as defined in claim 6, wherein said firing is carried out in an air atmosphere.

11. A coating process as defined in claim 6, wherein said slip mixture further comprises alumina.

12. A coating process as defined in claim 11, wherein said ingredients of the slip are contained in amounts within the following ranges of parts by weight: aluminum or aluminum alloy, 32–93.5; inhibitor, 0.5–5.0; and alumina, up to 60.

13. A coating process as defined in claim 11, wherein said ingredients of the slip mixture are contained in amounts within the following ranges of parts by weight: aluminum or alloy powder 40–60; inhibitor, 1–3; and alumina, 20–45.

14. The process defined in claim 6 wherein said water and the inhibitor ingredients are present respectively in quantities such that approximately 1000–6000 p.p.m. of boron oxide will be continuously and automatically in solution in said slip mixture prior to the firing step.

15. The process recited in claim 14 wherein said barium oxide, boron oxide and aluminum fluoride are present in a molar ratio of about 1:3:½, respectively.

16. A method of inhibiting reaction between water and small particles of a metal selected from the group consisting of aluminum and aluminum alloys comprising maintaining in said water approximaely .18 to 1.06% of unreacted boric acid by weight of said water.

17. A method of inhibiting reaction between water and small particles of a metal selected from the group consisting of aluminum and aluminum alloys comprisng maintaining in said water approximately .27 to 1.64% of unreacted borax by weight of said water.

18. A process of applying a diffused metallic protective coating to a metal article which comprises: coating the surface of said article with a mixture including small particles of a metal selected from the group consisting of aluminum and aluminum alloys and a water vehicle, and approximately .18 to 1.06 percent of unreacted boric acid by weight of said water whereby from 1000 to 6000 p.p.m. of boron oxide is maintained in solution for preventing reaction between the water and coating metal particles; and firing said coated article at an elevated temperature that causes the coating metal to develop a diffused metallic protective coating layer on the surface of said article.

19. A process of applying a diffused metallic protective coating to a metal article which comprises: coating the surface of said article with a mixture including small particles of a metal selected from the group consisting of aluminum and aluminum alloys and a water vehicle, and approximately .27 to 1.64 percent of unreacted borax by weight of said water to maintain from 1000 to 6000 p.p.m. of boron oxide in solution for preventing reaction between the water and coating metal particles; and firing said coated article at an elevated temperature that causes the coating metal to develop a diffused metallic protective coating layer on the surface of said article.

References Cited in the file of this patent

UNITED STATES PATENTS

| | | |
|---|---|---|
| 2,403,706 | Bryant | July 9, 1946 |
| 2,495,837 | Porter | Jan. 31, 1950 |
| 2,900,276 | Long et al. | Aug. 18, 1959 |
| 2,955,958 | Brown | Oct. 11, 1960 |